C. H. GEORGER.
VEHICLE SIGNAL.
APPLICATION FILED JULY 2, 1920.
1,394,000.
Patented Oct. 18, 1921.
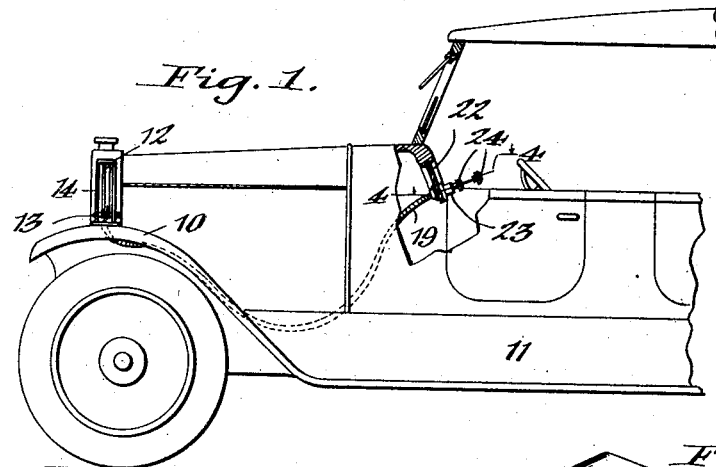
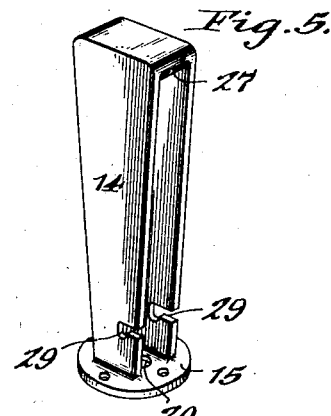
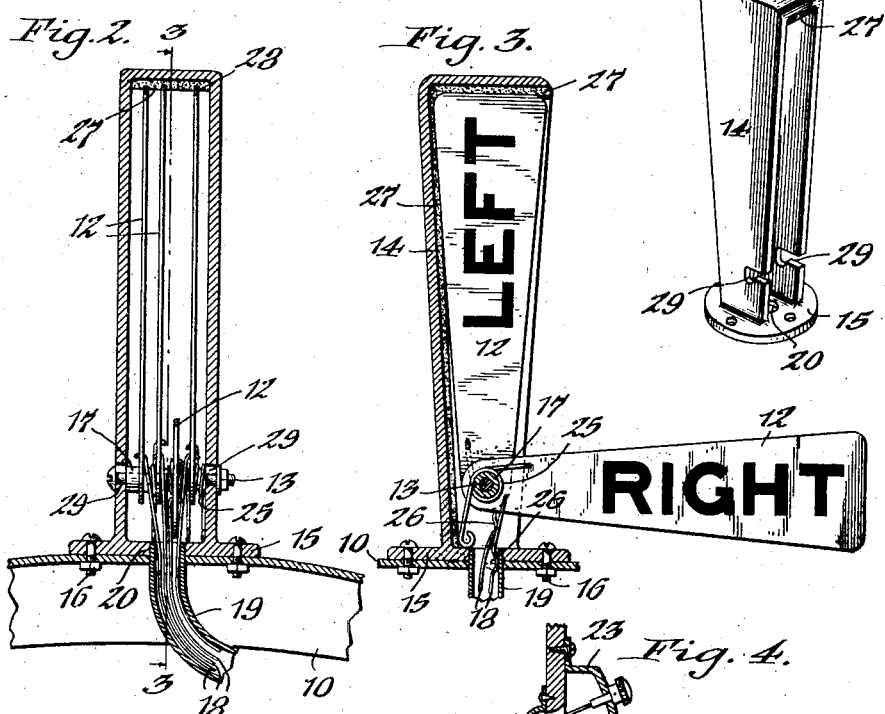
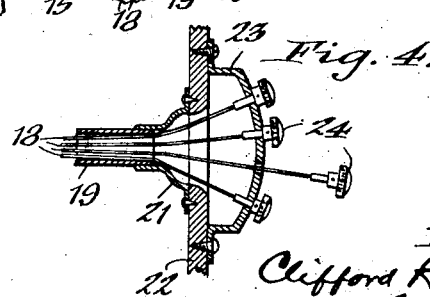

UNITED STATES PATENT OFFICE.

CLIFFORD H. GEORGER, OF BUFFALO, NEW YORK.

VEHICLE-SIGNAL.

1,394,000.   Specification of Letters Patent.   Patented Oct. 18, 1921.

Application filed July 2, 1920. Serial No. 393,509.

*To all whom it may concern:*

Be it known that I, CLIFFORD H. GEORGER, a citizen of the United States, residing in Buffalo, in the county of Erie and State of New York, have invented new and useful Improvements in Vehicle-Signals, of which the following is a specification.

This invention relates to the class of visual signals or indicators designed more particularly for use on automobiles to indicate to the drivers of following vehicles, as well as to traffic officers, and pedestrians, the intentions of the driver as to the particular direction he proposes to drive the vehicle.

Its principal object is the provision of a simple and inexpensive signal of this character which is conspicuous and plainly visible from either the front or rear end of the automobile.

A further object of the invention is to provide improved means for actuating the indicating arms.

In the accompanying drawings: Figure 1 is a sectional fragmentary elevation of an automobile equipped with my invention. Fig. 2 is an enlarged vertical section thereof. Fig. 3 is a vertical section on line 3—3, Fig. 2. Fig. 4 is an enlarged horizontal section on line 4—4, Fig. 1. Fig. 5 is a perspective view of the casing in which the indicating arms are mounted.

Similar characters of reference refer to like parts throughout the several views.

This improved signal is shown as preferably arranged on the front fender or mud guard 10 of the automobile 11, although if desired, it may be located on any other part thereof, where the same may be readily seen from either the front or rear end of the automobile.

In the construction shown in the drawings, the signal consists of one or more vertically swinging indicating arms or semaphores 12 pivotally mounted at their lower ends on a horizontal pivot bolt 13 arranged in the lower portion of a suitable casing or housing 14 having a base secured to the fender 10 by bolts 16 or other appropriate means, and of the proper dimensions to completely conceal the indicating arms when in their inoperative positions. This casing may be cast in one piece or stamped of sheet metal, it being closed at its back, sides and top and open at its front side which faces away from the side of the vehicle. In the drawings, four indicating arms are shown which bear on both sides thereof suitable direction characters, such as, "Left," "Right," "Stop" and "Straight." They are preferably arranged in spaced parallel relation to each other and are separated by suitable spacing collars or sleeves 17 mounted on the pivot bolt.

The indicating arms are actuated selectively or independently of each other and the means whereby this is accomplished, are preferably constructed as follows:

Connected to the lower ends of these arms, adjacent to the pivot bolt 13, are rigid actuating members 18 preferably constructed of steel wire, which extend through a flexible guide tube 19 suitably secured at one end in an opening 20 in the base of the casing 14 while its other end is secured to a collar 21 fastened to the front side of the dash board 22 of the automobile. Communicating with this guide tube is a casing 23 fastened to the rear side of the dash board and in which are arranged control buttons or knobs 24 to which the front ends of the wires 18 are connected. These control buttons bear characters corresponding to the direction characters on the indicating arms. Normally the latter are arranged in a vertical position within the casing 14 and the control buttons are in their inward position bearing against the wall of the casing 23. To retain these indicating arms in their inoperative position within the casing, coil springs 25 are provided which surround the spacing collars 17, one leg of each spring being connected to the corresponding indicating arm while the other end bears against the rear wall of the casing 14.

As shown in Fig. 1, the tube 19 follows a curved path from the casing to the dash board so that the actuating wires therein frictionally engage the inner wall of said tube, the resistance offered thereby being sufficient to overcome the tension of the springs 25 when the indicating arms are moved to their horizontal or operative position by exerting a pull on the corresponding control buttons. By this arrangement, each indicating arm is frictionally held in its operative position and in swinging it back into the casing the operator exerts a push on the corresponding control button, the spring 25 tending to swing the arm against the rear wall of said casing.

Each wire 18 is provided with a curved portion, hump or bend 26 adjacent that end connected to the indicating arm, which bears against the inner wall of the guide tube 19 when said arm is in its signaling position, thereby further assisting in holding the arm properly in position. When the indicating arm is in its vertical position, the hump of the wire is disposed above the mouth of the tube, as shown in Fig. 3.

In order to prevent the indicating arms from rattling and vibrating within the casing, a cushioning pad of felt or similar material 27 is arranged in the top and rear wall of the latter. The top edges of the arms engage grooves 28 in the top portion of this pad whereby they are prevented from chattering, while the rear edges of said arms engage the rear portions of the pad, cushioning the same when they are moved into the casing.

To facilitate assembling of the indicating arms within the casing, the latter is provided with slots or notches 29, preferably of L-shaped form, in the side walls thereof which are open at their front ends to receive the pivot bolt 13. This construction permits of assembling the indicating arms and associated parts as a unit on the pivot bolt before inserting the same within the casing.

I claim as my invention:

1. A signal of the character described comprising a casing having side walls and notches arranged therein and extending to the edges thereof, a pivot bolt supported in said notches, an indicating arm pivotally mounted at its lower end on said bolt to swing into and out of said casing, and means for actuating said arm.

2. A signal of the character described comprising a casing having side walls and notches arranged therein and extending to the edges thereof, a pivot bolt supported in said notches, a plurality of indicating arms pivotally mounted at their lower ends on said bolt to swing into and out of said casing, spacing collars arranged on said bolt and between said arms, and means for actuating said arms.

3. In a signal of the character described, the combination of a casing, an indicating arm pivotally mounted at its lower end in said casing to swing into and out of the same, a tube connecting with said casing, a rigid actuating member arranged within said tube and connected at one end to said indicating arm, said member being provided with a curved portion adapted to frictionally engage the wall of said tube in one position of said indicating arm, and resilient means for holding said arm in its other position.

4. In a signal of the character described, the combination of a casing, an indicating arm pivotally mounted in said casing, to swing into and out of the same, a tube connecting with said casing, a rigid actuating member arranged within said tube and connected at one end to said indicating arm, said member being provided with a curved portion adapted to frictionally engage the wall of said tube when said indicating arm is moved to its operative position, and a spring for holding said arm in its inoperative position.

CLIFFORD H. GEORGER.